US012640355B2

(12) United States Patent
Reed et al.

(10) Patent No.: US 12,640,355 B2
(45) Date of Patent: May 26, 2026

(54) ION TRAP WITH REDUCED RADIO FREQUENCY (RF) CURRENTS USING MULTIPLE FEED PORTS

(71) Applicant: Quantinuum LLC, Broomfield, CO (US)

(72) Inventors: Adam Reed, Broomfield, CO (US); Matthew D. Swallows, Broomfield, CO (US); Christopher Eugene Langer, Highlands Ranch, CO (US)

(73) Assignee: QUANTINUUM LLC, Broomfield, CO (US)

( * ) Notice: Subject to any disclaimer, the term of this patent is extended or adjusted under 35 U.S.C. 154(b) by 340 days.

(21) Appl. No.: 18/321,979

(22) Filed: May 23, 2023

(65) Prior Publication Data

US 2024/0014023 A1 Jan. 11, 2024

Related U.S. Application Data

(60) Provisional application No. 63/367,774, filed on Jul. 6, 2022.

(51) Int. Cl.
*H01J 49/02* (2006.01)
*H01J 49/42* (2006.01)

(52) U.S. Cl.
CPC .......... *H01J 49/022* (2013.01); *H01J 49/424* (2013.01)

(58) Field of Classification Search
CPC .............................. H01J 49/022; H01J 49/424
See application file for complete search history.

(56) References Cited

U.S. PATENT DOCUMENTS

| | | | | |
|---|---|---|---|---|
| 10,804,871 | B1 | 10/2020 | Reed et al. | |
| 11,037,776 | B1 | 6/2021 | Makotyn et al. | |
| 2019/0304765 | A1* | 10/2019 | Hoyes ..................... | H01J 49/40 |
| 2023/0187095 | A1 | 6/2023 | Volin et al. | |

FOREIGN PATENT DOCUMENTS

| | | | |
|---|---|---|---|
| JP | 2019-160795 | A | 9/2019 |
| WO | 2021/092233 | A1 | 5/2021 |
| WO | 2021/205145 | A1 | 10/2021 |

OTHER PUBLICATIONS

Johnson, Nicholas Ian, "A scalable demonstrator for trapped-ion quantum computing using modules connected by electric fields", Ph.D. Thesis for University of Sussex, Oct. 1, 2021, retrieved from the Internet at https://sussex.figshare.com/articles/thesis/A_scalable_demonstrator_for_trappedion_quantum_computing_using_modules_connected_by_electric_fields/23487251/1/files/41195876.pdf, retrieved on Mar. 26, 2024, 188 pages.

(Continued)

*Primary Examiner* — Nicole M Ippolito
(74) *Attorney, Agent, or Firm* — ALSTON & BIRD LLP

(57) ABSTRACT

Various embodiments provide ion traps or systems comprising ion traps that comprise a trapping portion and a radio frequency (RF) border electrode bounding the trapping portion. The RF border electrode comprises or is in electrical communication with a plurality of feed ports. In an example embodiment, the ion trap comprises a plurality of unit cells each comprising a respective trapping portion, a respective RF border electrode bounding the respective trapping portion, and a respective feed port of the plurality of feed ports.

20 Claims, 8 Drawing Sheets

(56) References Cited

OTHER PUBLICATIONS

Figure 1:
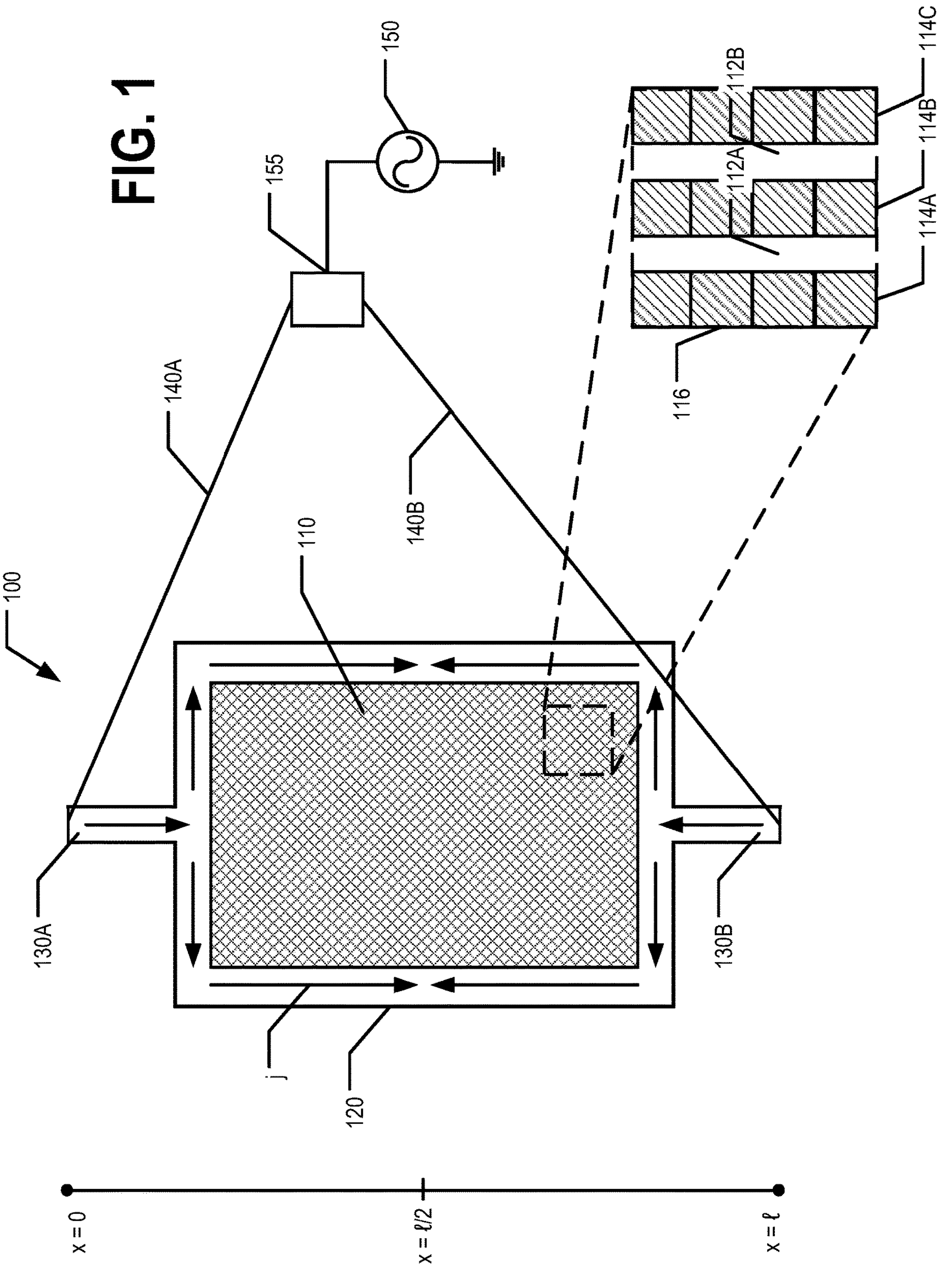

Outgoing—ISA/210—International Search Report Mailed on Dec. 19, 2024 for WO Application No. PCT/US23/026970, 7 page(s).
Outgoing Written Opinion of the ISA Mailed on Dec. 19, 2024 for WO Application No. PCT/US23/026970, 12 page(s).
Gan, H. C. J. , et al., "Oscillating magnetic field effects in high precision metrology," Jul. 7, 2018, retrieved from Cornell University Online Library Archive on the Internet at https://arxiv.org/pdf/1807.00424.pdf on Mar. 5, 2024, 10 pages.
Holz, Philip C., et al., "2D Linear Trap Array for Quantum Information Processing", Advanced Quantum Technologies, Sep. 16, 2020, 20 pages, vol. 3, No. 2000031, Wiley-VCH GmbH, Germany.
Hughes, Marcus D., et al., "Microfabricated Ion Traps", Jun. 28, 2011, retrieved from Cornell University Online Library Archive on the Internet at https://arxiv.org/pdf/1101.3207.pdf on Mar. 5, 2024, 28 pages.
Kumph, M., et al., "Operation of a planar-electrode ion-trap array with adjustable RF electrodes," New Journal of Physics, Feb. 19, 2016, 16 pages, vol. 18, No. 023047, IOP Publishing Ltd and Deutsche Physikalische Gesellschaft, US and Germany.
Pino, J. M. "Demonstration of the trapped-ion quantum-CCD computer architecture," Apr. 9, 2021, retrieved from Cornell University Online Library Archive on the Internet at https://arxiv.org/pdf/2003.01293v4.pdf on Mar. 5, 2024, 11 pages.
U.S. Provisional Application for "Atomic Object Confinement Apparatus with Radio Frequency Electrode Shaping for Periodic Boundary Conditions", unpublished (filed Dec. 10, 2021), Curtis Volin (Inventor), Quantinuum LLC (Applicant), U.S. Appl. No. 63/265,211.
English Translation of JP Office Action dated Mar. 24, 2026 for JP Application No. 2025500158, 2 page(s).
JP Office Action Mailed on Mar. 24, 2026 for JP Application No. 2025500158, 3 page(s).

* cited by examiner

ION TRAP WITH REDUCED RADIO FREQUENCY (RF) CURRENTS USING MULTIPLE FEED PORTS

CROSS-REFERENCE TO RELATED APPLICATIONS

This application claims priority to U.S. Application No. 63/367,774, filed Jul. 6, 2022, the content of which is incorporated by reference herein in its entirety.

TECHNICAL FIELD

Various embodiments relate to apparatuses, systems, and methods for ion traps. Various embodiments to ion traps that have reduced RF currents and multiple RF feed ports.

BACKGROUND

An ion trap can use electrical and/or magnetic fields to capture one or more ions in a potential well. Ions can be trapped for several purposes, which may include mass spectrometry, atomic frequency standards research, and/or controlling quantum states (e.g., such as for quantum information processing), for example. Through applied effort, ingenuity, and innovation many deficiencies of such prior ion traps have been solved by developing solutions that are structured in accordance with the embodiments of the present invention, many examples of which are described in detail herein.

BRIEF SUMMARY OF EXAMPLE EMBODIMENTS

Example embodiments provide ion trap apparatuses, quantum computers comprising ion trap apparatuses, quantum computer systems comprising ion trap apparatuses, and/or the like where the ion trap is configured to have reduced RF currents (compared to a conventional RF trap) using multiple RF feed ports.

Various embodiments provide ion traps or systems comprising ion traps that are configured to operate with a reduced RF current density due to the use of a plurality of feed ports to apply signals that drive the RF current density in an RF border electrode of the ion trap. In an example embodiment, the ion trap comprises a trapping portion and an RF border electrode bounding the trapping portion. The RF border electrode comprises or is in electrical communication with a plurality of feed ports.

In an example embodiment, each of the plurality of feed ports is configured to apply a respective RF current and/or voltage signal of a plurality of RF current and/or voltage signals to the RF border electrode.

In an example embodiment, the plurality of RF current and/or voltage signals are synchronized in frequency.

In an example embodiment, respective positions of the plurality of feed ports and respective phases of the plurality of RF current and/or voltage signals are configured such that a phase of a current density driven in the RF border electrode by application of the plurality of RF current and/or voltage signals to the RF border electrode by the plurality of feed ports is continuous at all points of the RF border electrode.

In an example embodiment, the phase of the current density is smooth across at all the points of the RF border electrode.

In an example embodiment, the plurality of RF current and/or voltage signals are synchronized in phase.

In an example embodiment, each of the plurality of feed ports is configured to be in electrical communication a respective RF source of one or more RF sources.

In an example embodiment, the one or more RF sources comprises a plurality of RF sources and each of the plurality RF sources is (a) frequency-locked to at least one other of the plurality of RF sources, (b) frequency-locked to a common reference, or (c) frequency-locked to at least one of a set of coupled references.

In an example embodiment, each of the plurality of feed ports is configured to be in electrical communication with a respective RF source of one or more RF sources, each of the one or more RF sources configured to generate a respective RF current and/or voltage signal such that the respective feed port applies the respective RF current and/or voltage signal to the RF border electrode.

In an example embodiment, application of the respective RF current and/or voltage signal by the respective feed port causes an RF current density to be driven in the RF border electrode.

In an example embodiment, the RF current density is less than a single feed port current density that would be required to operate the in trap if the ion trap only comprise a single feed port.

In an example embodiment, the plurality of feed ports are disposed at respective positions about the RF border electrode such that the respective positions are symmetric with respect to at least one axis defined by the RF border electrode.

In an example embodiment, the ion trap comprises a plurality of unit cells, each unit cell comprising a respective trapping portion, a respective RF border electrode, and a respective feed port of the plurality of feed ports.

In an example embodiment, the plurality of unit cells are a tiling of the ion trap.

In an example embodiment, each unit cell of the plurality of unit cells characterizes (a) a length that is less than or equal to a threshold length when the respective trapping portion comprises a one-dimensional configuration of linear trapping regions, (b) an area that is less than or equal to a threshold area when the respective trapping portion comprises a two-dimensional configuration of linear trapping regions, or (c) a volume that is less than or equal to a threshold volume when the respective trapping portion comprises a three-dimensional configuration of linear trapping regions.

In an example embodiment, a portion of the respective RF border electrode of a first unit cell and a portion of the respective RF border electrode of a second unit cell that is an immediate neighbor of the first unit cell is a same physical electrode.

In an example embodiment, the plurality of feed ports are configured to reduce the conductive losses of the ion trap when the ion trap is operated.

In an example embodiment, the RF border electrode is (a) a continuous RF electrode or (b) comprises two or more electrically distinct RF electrodes.

In an example embodiment, the ion trap is part of a quantum charge-coupled device (QCCD)-based quantum computer and manipulatable objects confined by the ion trap are used as qubits of the QCCD-based quantum computer.

In an example embodiment, each of the plurality of feed ports is configured to be in electrical communication with a respective RF source of one or more RF sources and a controller of the QCCD-based quantum computer is configured to control operation of the one or more RF sources.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 provides a schematic diagram an ion trap comprising multiple feed ports, in accordance with an example embodiment.

Figure 1A:
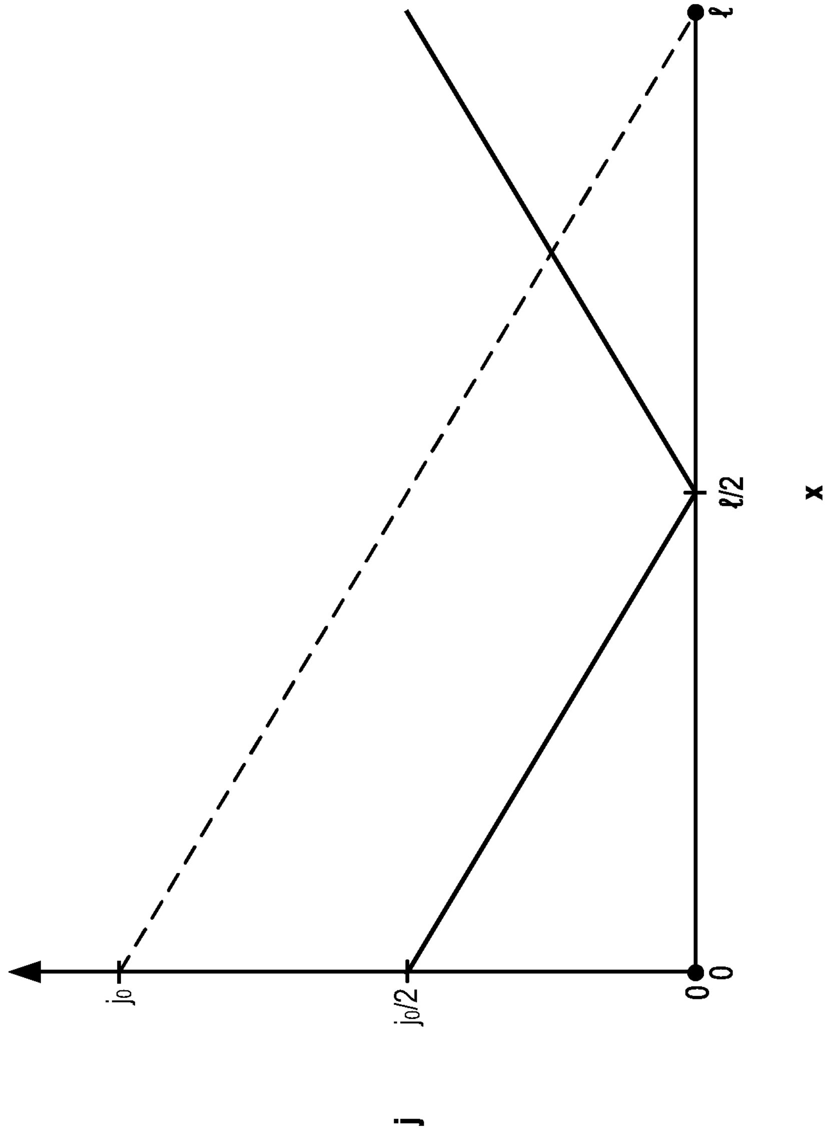

FIG. 1A provides a plot illustrating the current density across the ion trap shown in FIG. 1 compared to a conventional ion trap.

Figure 2:
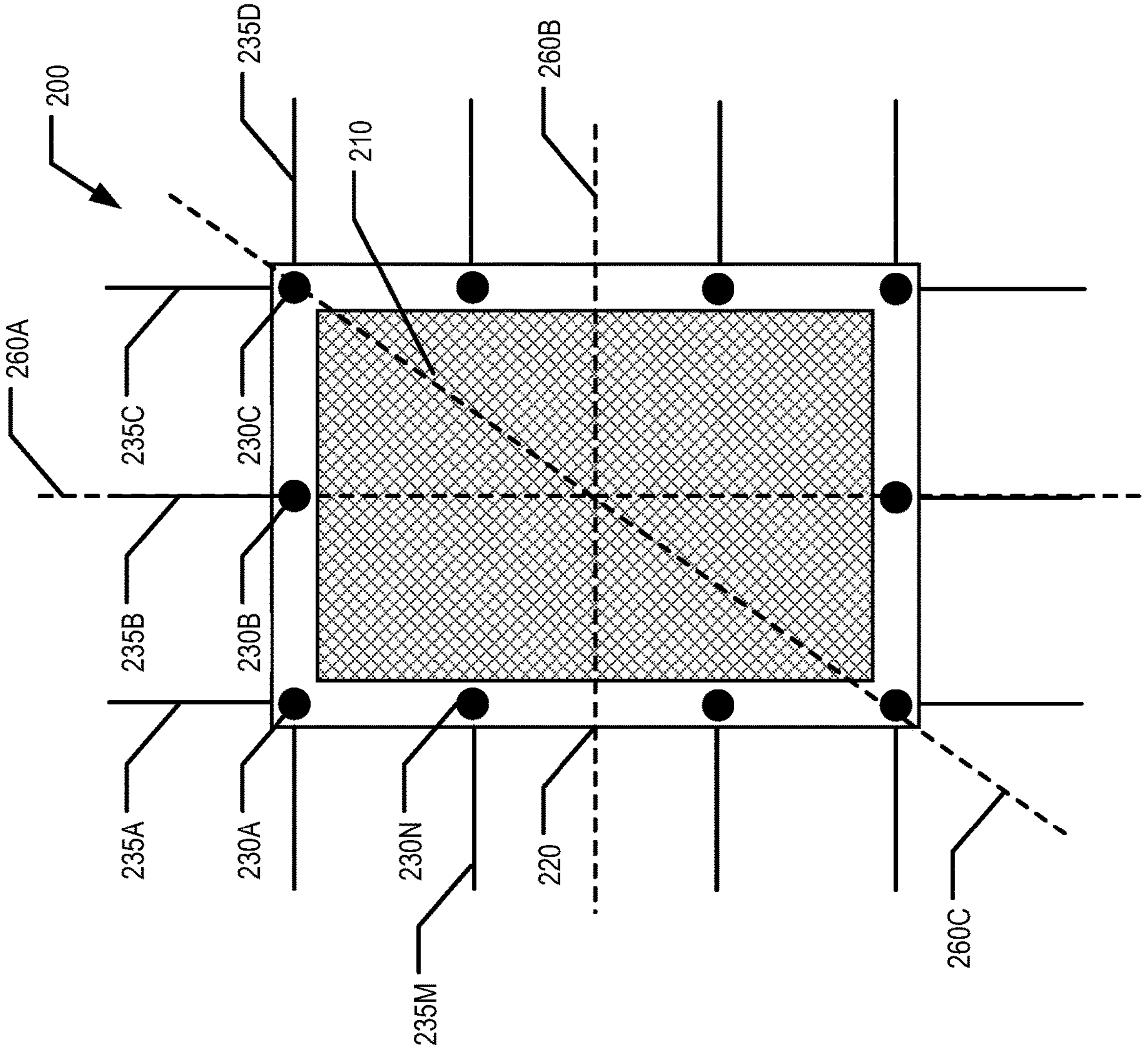

FIG. 2 provides a schematic diagram of another ion trap comprising multiple feed ports, in accordance with an example embodiment.

Figure 3:
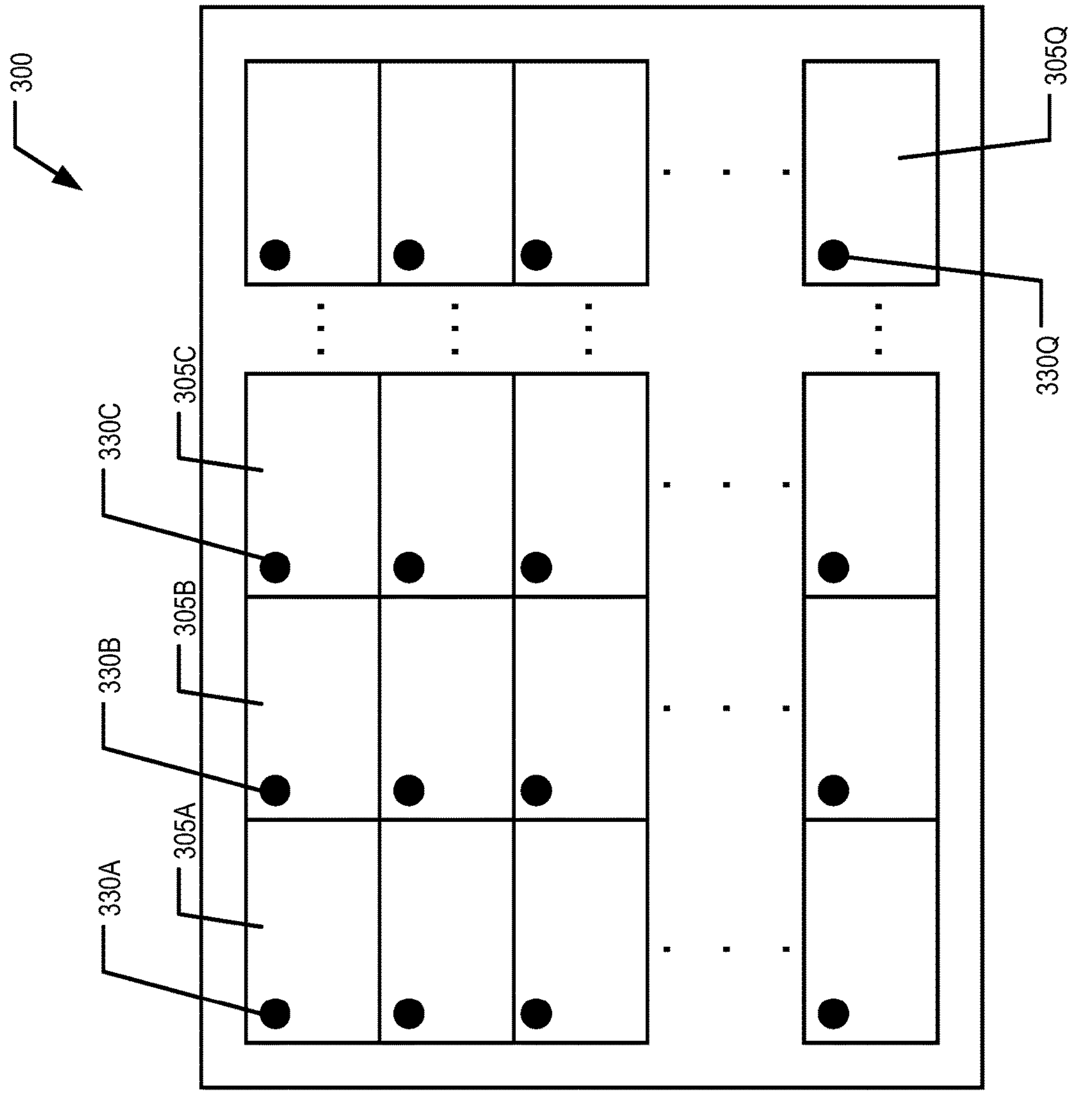

FIG. 3 provides a schematic diagram of an ion trap that includes a plurality of unit cells with each unit cell comprising a respective feed port, in accordance with an example embodiment.

Figure 3A:
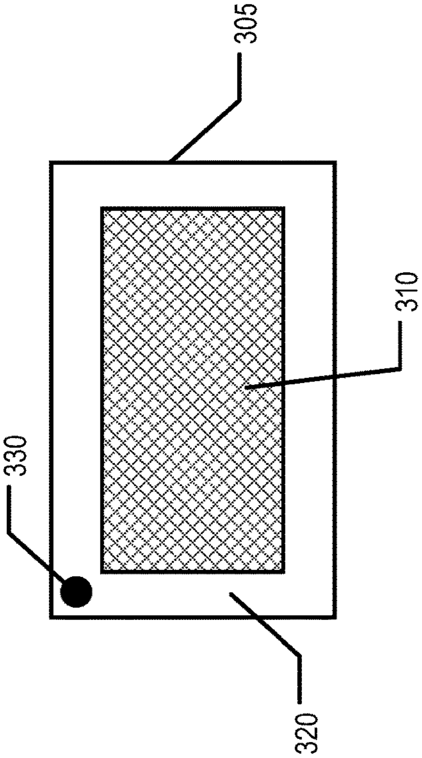

FIG. 3A provides a schematic diagram of an example unit cell of the ion trap shown in FIG. 3.

Figure 4:
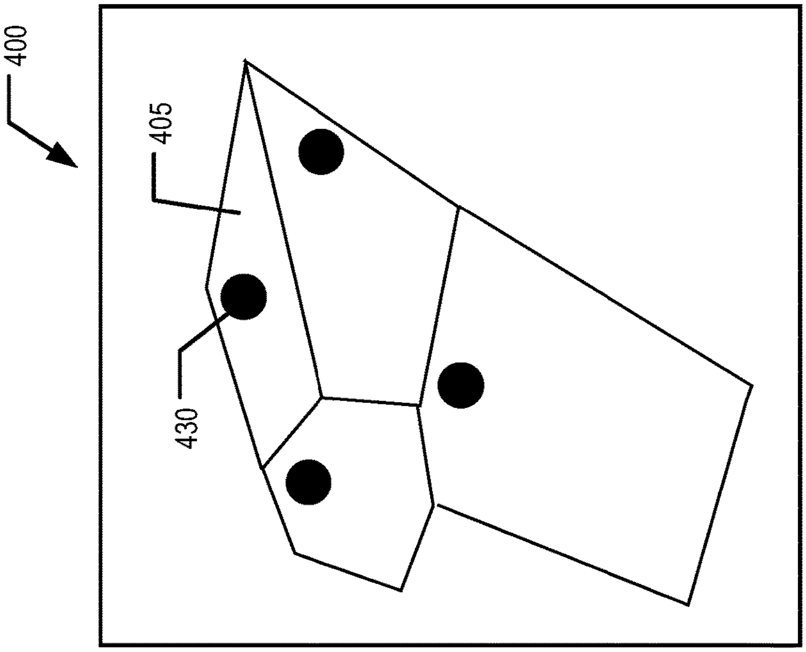

FIG. 4 provides a schematic diagram of another ion trap that includes a plurality of unit cells with each unit cell comprising a respective feed port, in accordance with an example embodiment.

Figure 5:
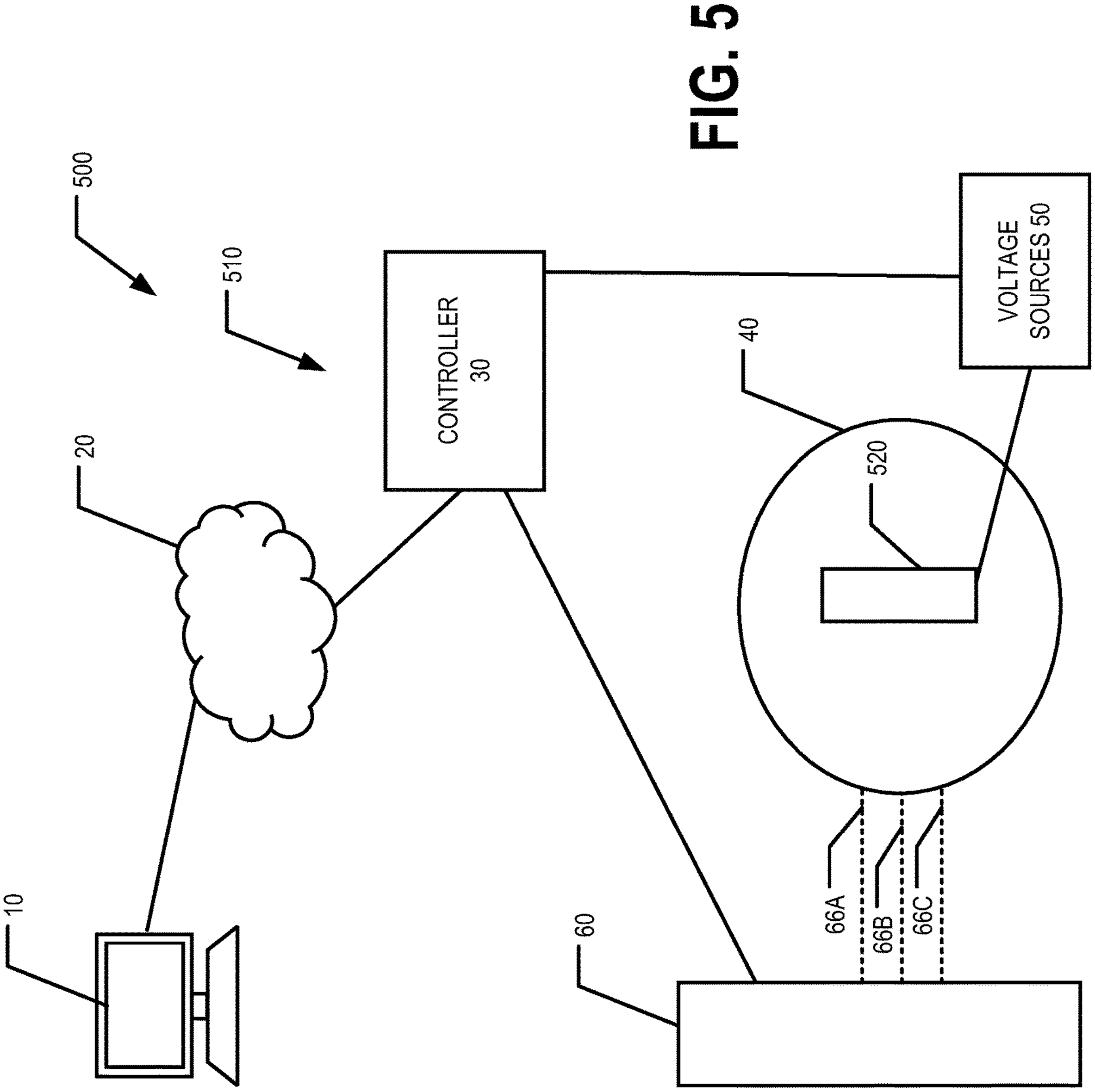

FIG. 5 provides a schematic diagram of a quantum computer comprising an ion trap, in accordance with an example embodiment.

Figure 6:
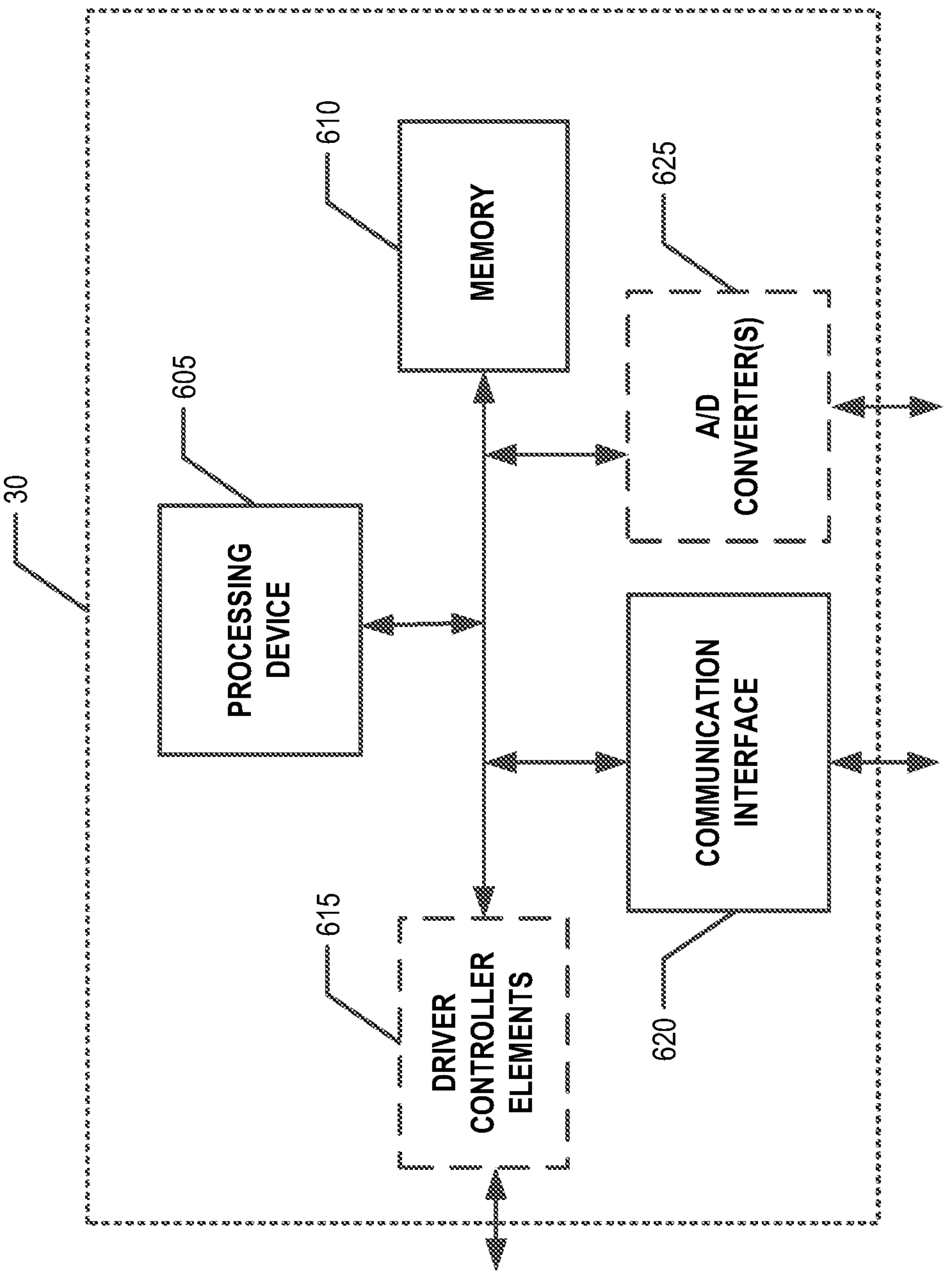

FIG. 6 provides a schematic diagram of an example controller of a quantum computer comprising an ion trap apparatus, in accordance with an example embodiment.

Figure 7:
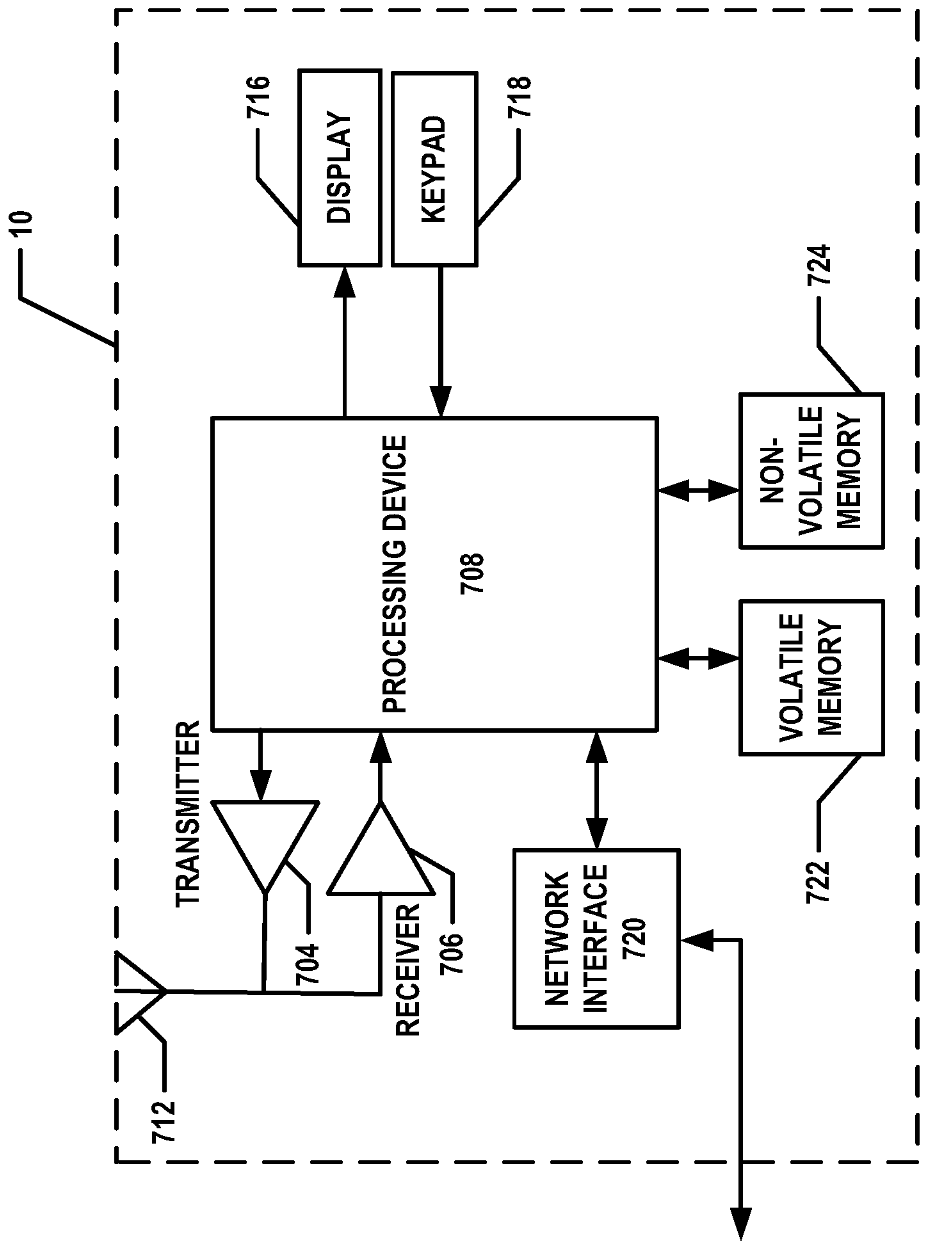

FIG. 7 provides a schematic diagram of an example computing entity of a quantum computer system that may be used in accordance with an example embodiment.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally" and "approximately" refer to within engineering and/or manufacturing limits and/or within user measurement capabilities, unless otherwise indicated. Like numbers refer to like elements throughout.

Conventionally, an ion trap comprises one or more radio frequency (RF) electrodes or rails. The RF electrodes and/or rails are fed through a single feed port such that the current spreads (and dissipates) across the trap through the RF electrodes and/or rails. The application of an RF current or voltage to the RF electrodes and/or rails is configured to generate one or more linear trapping regions within the ion trap for trapping manipulatable objects. As used herein, manipulatable objects are objects that can be manipulated and/or trapped by the ion trap such as ions, multipole atoms or molecules, charged molecules, and/or charged particles.

As the ion trap increases in size, the RF current applied to the single feed port is required to increase due to conductive and dielectric losses of the ion trap that increase as the size of the ion trap increases. However, the increase in current causes an increase in the magnitude of the magnetic field generated by the current. The increased magnitude of the magnetic field causes shifts in the phase of ions trapped within the ion trap. When these ions are used as qubits of a quantum computer, these shifts in phase result in increased memory errors. For example, for field insensitive qubits, these phase shifts increase with the time-averaged magnetic field magnitude B as B squared (e.g., $B^2$), which results in the memory error scaling as the time-averaged magnetic field magnitude B to the fourth power (e.g., $B^4$). In another example, for field sensitive qubits, decoherence of qubits induced by noise in the RF currents increases as the time-averaged magnetic field magnitude B squared (e.g., $B^2$). Therefore, a relatively small increase in the time-averaged magnetic field magnitude (also referred to herein simply as the magnetic field magnitude) may result in significant memory errors.

Therefore, technical problems exist regarding how to maintain the RF current applied to the RF electrodes or rails of the ion trap such that a sufficient pseudo-trapping potential is generated at all trapping regions of the ion trap and the magnetic field magnitude is minimized and/or maintained at a reasonable level.

Additionally, the RF current dissipates as the RF current spreads throughout the ion trap. This leads to a large current density gradient throughout the ion trap, which in turn leads to a large magnetic field gradient throughout the ion trap. This large magnetic field gradient can cause predicting and correcting the memory errors caused by the magnetic field more difficult.

Various embodiments provide technical solutions to these technical problems. Various embodiments provide ion traps, and/or systems comprising ion traps, that comprise an RF border electrode configured to have RF currents and/or voltages applied thereto via multiple feed ports. In various embodiments, an RF border electrode is an RF electrode that surrounds, encircles, and/or defines the border of at least a portion of the ion trap. For example, in various embodiments, an RF border surrounds, encircles and/or defines the border of the trapping portion of the ion trap (e.g., the portion of the ion trap configured for trapping manipulatable objects such as ions, multipole atoms/molecules, charged molecules, and/or charged particles).

In various embodiments, the RF border surrounds, encircles, and/or defines the border of one or more unit cells of the trapping portion of the ion trap. For example, in various embodiments, the trapping portion of the ion trap is tiled (uniformly or not uniformly, depending on the embodiment) by a plurality of unit cells. Each unit cell is bounded by an RF border electrode and/or portion thereof. In various embodiments, each unit cell is associated with a respective feed port configured for use in applying an RF current and/or voltage to the RF border electrode the bounds the respective unit cell.

In various embodiments, the feed ports are configured to apply RF current and/or voltage to the RF border electrode in a symmetric manner about one or more axes of the ion trap and/or the trapping portion of the ion trap. In various embodiments, the ion trap and/or system comprising the ion trap is configured such that the RF current and/or voltage applied to each feed port is synchronized in frequency and/or phase.

In various embodiments, the application of RF current and/or voltage at multiple points along the RF border electrode results in the currents driven in the RF border electrode being smaller than in a conventional ion trap fed by a single RF feed port. This smaller current results in the generation of smaller magnitude magnetic fields. The smaller current also results in less heat being generated and/or dissipated by the RF border electrode. This decrease in the magnetic field magnitude and in the heat generated and/or dissipated by the RF border electrode contributes to decreasing perturbations in systems comprising such an ion trap. For example, the decrease in the magnetic field magnitude and in the heat generated and/or dissipated by the RF border electrode reduces the memory errors in a quantum charge-coupled device (QCCD)-based quantum computer comprising an ion trap in accordance with an example embodiment compared to a QCCD-based quantum computer comprising a conventional ion trap.

Additionally, the current gradient across the ion trap is smaller than in a conventional ion trap fed by a single RF feed port, which results in a smaller magnetic field gradient across the ion trap. The symmetric distribution of the feed ports and/or the per unit cell distribution of the feed ports enables minimization of the current driven in the RF electrode, enabling the minimization of the magnetic field and magnetic field gradient across the trapping portion of the ion trap. Thus, various embodiments provide improvements to the field of ion traps and systems comprising ion traps.

Some Example Embodiments of Ion Traps Each Comprising Multiple Feed Ports

Various embodiments provide ion traps with multiple and/or a plurality of feed ports. Each feed port is configured to receive an RF current and/or voltage signal and is electrically coupled to and/or a part of an RF border electrode of the ion trap. By driving the current density propagating through the RF border electrode at multiple points (e.g., via the RF current and/or voltage signals respectively applied to the multiple and/or plurality of feed ports), the magnitude of the current density is significantly decreased, which decreases the heat dissipated by the RF border electrode and the magnitude of the resulting magnetic field.

FIG. 1 provides a schematic diagram of an ion trap 100 comprising a plurality of feed ports, according to an example embodiment. The ion trap 100 comprises an RF border electrode 120 that is an RF electrode that surrounds, encircles, and/or defines the border of at least a portion of the trapping portion 110 of the ion trap 100. In an example embodiment, an RF border electrode 120 is similar to an RF bus electrode disclosed by U.S. application Ser. No. 18/049,845, filed Oct. 26, 2022, the content of which is incorporated herein by reference in its entirety. In an example embodiment, the RF border electrode 120 is continuous or single RF electrode. In an example embodiment, the RF border electrode 120 is a segmented RF electrode and/or comprises two or more electrically distinct RF electrodes (e.g., RF electrodes that are not directly in electrical communication with one another).

The trapping portion 110 defines one or more trapping regions and/or zones. For example, the trapping portion 110 may define a linear trapping region, a series or sequence of connected linear trapping regions, a two-dimensional array of linear trapping regions, and/or the like. In various embodiments, each linear trapping region may comprise one or more zones, where each zone is configured for performing one or more functions of the ion trap and/or the system comprising the ion trap. For example, a linear trapping region may comprise one or more zones in which the system comprising the ion trap is configured to perform one or more actions on one or more manipulatable objects (e.g., cause one or more laser beams to be incident on the one or more manipulatable objects to perform a logical gate, cooling operation, qubit reading operation, state preparation operation, and/or the like). For example, a linear trapping region may comprise one or more zones in which one or more manipulatable objects may be maintained and/or stored in while actions are being performed on other manipulatable objects such that the one or more manipulatable objects being maintained and/or stored are not affected by the actions being performed on the other manipulatable objects. The layout of the trapping portion 110 may vary between various embodiments, as appropriate for the application.

As shown by the zoomed in portion, the trapping portion 110 of the ion trap 100 comprises one or more RF rails 112 (e.g., 112A, 112B) and one or more sequences of segmented electrodes 114 (e.g., 114A, 114B, 114C). Each sequence of segmented electrodes 114 comprises a plurality of segmented electrodes 116 that are configured to have series or sequences of direct current (DC) voltages applied thereto. For example, in an example embodiment, the RF rails 112 and sequences of segmented electrodes 114 each comprising a plurality of segment electrodes 116 are similar to the RF rails and sequences of trapping and transport (TT) electrodes described in U.S. Pat. No. 11,037,776, issued Jun. 15, 2021, the content of which is incorporated herein by reference in its entirety.

The RF border electrode 120 comprises and/or is coupled into electrical communication with a first feed port 130A and a second feed port 130B. Each of the first feed port 130A and the second feed port 130B are configured to receive a signal generated by a respective RF source 150 via a respective conductive line 140 (e.g., 140A, 140B). In an example embodiment, two or more feed ports 130 (e.g., 130A, 130B) are configured to receive a signal generated by a common RF source 150 that is split via a splitter 155. In an example embodiment, each feed port 130 is configured to receive a signal from a distinct RF source 150. In an example embodiment in which each feed port 130 is configured to receive a signal from a distinct RF source 150, each of the RF sources are frequency and/or phase locked with one another and/or independently frequency and/or phase locked to a common frequency and/or phase (e.g., independently locked to a common oscillator and/or a set of interlocked oscillators).

In various embodiments, the RF sources 150 may be various types of RF signal generators. For example, in an example embodiment, the RF sources 150 comprise one or more digital to analog (DAC) RF signal generators, arbitrary waveform generators (AWG), amplifier-resonator systems configured to provide amplified voltage from the resonator (for example, see U.S. Pat. No. 10,804,871, issued Oct. 13, 2020, the content of which is hereby incorporated by reference herein in its entirety), and/or the like.

In the illustrated embodiment, the first and second feed ports 130A, 130B are each configured to receive a respective RF current and/or voltage signal generated by the RF source 150 and split via splitter 155. The lengths and/or other characteristics of the first and second conductive lines 140A, 140B are configured such that the RF current and/or voltage applied to the first feed port 130A is synchronized with the frequency and/or phase of the RF current and/or voltage applied to the second feed port 130B. In an example embodiment, the magnitude of the RF current and/or voltage applied to the first and second feed ports 130A and 130B is substantially the same. For example, the splitter 155 and the conductive lines 140A, 140B are configured, in an example embodiment, to provide respective RF currents and/or voltages to the first and second feed ports 130A, 130B that are equal in magnitude and synchronized in frequency and phase. For example, in various embodiments, the conductive lines 140 (traces and/or the like) fan out from the RF source(s) 150 such that the length and/or other properties of the conductive lines 140 ensure the phase difference between the RF current and/or voltage signals applied to the respective feed ports 130 are minimized.

In an example embodiment, the phase and/or frequency of the respective RF currents and/or voltages applied to the feed ports 130 are configured such that the phase of the current density j propagating through the RF border electrode 120 is continuous and/or smooth (or at least has a continuous first derivative). For example, the phase and/or frequency of the RF currents and/or voltages applied to the feed ports 130 are configured such that the phase of the current density j is continuous and/or smooth (or at least has a continuous first derivative) at the position $x=\ell/2$.

FIG. 1A illustrates a plot that schematically represents the decreased magnitude of the current density along the length of the RF border electrode 120 for the ion trap 100 comprising two feed ports 130 shown in FIG. 1 as a solid line compared to a conventional ion trap that is similar in shape and size to ion trap 100 but is configured to only have an RF current and/or voltage signal applied to the first feed port 130A (shown as the dashed line). As can be seen from FIG. 1A, the maximum magnitude of the current density is significantly reduced for the ion trap 100 configured to receive RF current and/or voltage signals at multiple feed ports 130 compared to the conventional ion trap.

In this example embodiment, the maximum current density is decreased by a factor of 2. As the magnitude of the magnetic field scales linearly with the current density the maximum magnitude of the magnetic field is also decreased by a factor of 2. As described above, for various types of qubits, the qubit phase shift scales as $B^2$ or $B^4$. Thus, a decrease in the magnitude of the magnetic field by a factor of 2 results in a decrease in the qubit phase shift by a factor of 4 or 16, in various types of qubits. This significant decrease in the qubit phase shifts results in a significant decrease in memory errors. Thus, various embodiments of QCCD-based quantum computers comprising an ion trap in accordance with an example embodiment provide significantly decreased memory errors compared to conventional QCCD-based quantum computers.

FIG. 2 illustrates an ion trap 200 in accordance with another example embodiment. The ion trap 200 comprises an RF border electrode 220 and a trapping portion 210. The RF border electrode 220 is in electrical communication with a plurality of feed ports 230 (e.g., 230A, 230B, 230C, . . . 230N). In an example embodiment, the feed ports 230 comprise and/or are in electrical communication with vias though which the a respective RF current and/or voltage signal is applied (via the respective feed port) to the RF border electrode 220. For example, feed port 230A may comprise a via that extends through at least a portion of a chip and/or substrate on which the ion trap 200 is formed so as to place the feed port 230A into electrical communication with a corresponding RF source.

In an example embodiment, each feed port 230 is in electrical communication with one or more RF traces or conductive lines 235 (e.g., 235A, 235B, 235C, 235D, . . . , 235M). In such an embodiment, RF current and/or voltage signals may be applied to a respective feed ports 230 via respective RF traces or conductive lines 235. In various embodiments, one or more RF sources are configured to provide and/or apply respective RF current and/or voltage signals to respective feed ports 230 via respective RF traces or conductive lines 235.

In various embodiments, the plurality of feed ports 230 are in electrical communication with a plurality of RF sources. For example, in an example embodiment, each feed port 230 is in electrical communication with a distinct RF source. In other words, each RF source is in electrical communication with a single feed port 230. In an example embodiment, an RF source is in electrical communication with two or more feed ports 230 (e.g., up to N feed ports, where N is the number of feed ports).

In various embodiments, the RF sources, RF traces or conductive lines 235, and/or vias are configured such that the RF current and/or voltage signals applied to each feed port 230 are synchronized in frequency and/or phase with each of the other RF current and/or voltage signals applied to each of the other feed ports 230. For example, the RF current and/or voltage signal applied to the first feed port 230A is synchronized in frequency and/or phase with the respective RF current and/or voltage signals applied to each of the second feed port 230B, the third feed port 230C, and the Nth feed port 230N. In an example embodiment, the magnitude of the RF current and/or voltage signals applied to each feed port 230 are equal and/or substantially equal.

In an example embodiment, the relative frequencies and/or phases of the RF current and/or voltage signals applied to the respective feed ports 230 are configured such that the phase of the current density is continuous and/or smooth (or at least has a continuous first derivative) across the RF border electrode 220. For example, in an example embodiment, each of the RF sources are frequency locked (with one another and/or with an external reference oscillator) such that the RF current and/or voltage signals applied to the feed ports 230 are characterized by the same frequency and the phases of the RF current and/or voltage signals applied to the feed ports 230 are configured such that the phase of the current density j is continuous and/or smooth (or at least has a continuous first derivative) across the RF border electrode 220.

In an example embodiment, the locations at which the feed ports 230 are disposed about the RF border electrode 220 are symmetric with respect to one or more axes of the ion trap 200 and/or the RF border electrode 220. For example, the illustrated example embodiment comprises feed ports 230 disposed symmetrically (e.g., via reflection symmetry) about the RF border electrode 220 with respect to a first axis 260A of the ion trap 200 and/or RF border electrode 220 and disposed symmetrically (e.g., via reflection symmetry) about the RF border electrode 220 with respect to the second axis 260B of the ion trap 200 and/or RF border electrode 220. For example, the illustrated embodiment comprises feed ports 230 disposed symmetrically (e.g., via rotational symmetry) with respect to the third axis 260C of the ion trap 200 and/or RF border electrode 220.

The number and placement of feed ports 230 enables the magnitude of the current density used to operate the ion trap 200 to be reduced significantly with respect to a similarly sized and shaped conventional ion trap comprising a single feed port. Thus, the ion trap 200 exhibits less heating and smaller magnetic fields compared to a similarly sized and shaped conventional ion trap.

FIG. 3 provides a schematic diagram of an ion trap 300 comprising a plurality of unit cells 305 (e.g., 305A, 305B, 305C, . . . , 305Q). The unit cells 305 are a tiling of the ion trap 300, in an example embodiment. For example, the unit cells 305 may be a tiling of the trapping portion 110, 210 of an ion trap 100, 200. Each unit cell 305 is associated with a respective feed port 330 (e.g., 330A, 330B, 330C, . . . , 330Q). As shown in FIG. 3A, each unit cell 305 comprises a trapping portion 310 that is bounded by an RF border electrode 320. The RF border electrode 320 is in electrical communication with and/or comprises a respective feed port 330.

In various embodiments, immediately neighboring unit cells (e.g., 305A and 305B) share a common RF border electrode 320 portion. For example, the side of the RF border electrode 320 of the first unit cell 305A that is closest to the second unit cell 305B and the side of the RF border electrode 320 of the second unit cell 305B that is closest to the first unit cell 305A is the same physical electrode, in an example embodiment.

In the example embodiment illustrated in FIG. 3, the unit cells 305 are a uniform tiling of the ion trap 300. For example, each of the unit cells 305 has the same geometry. For example, the geometry of the first unit cell 305A is the same the geometry of the second unit cell 305B, the third unit cell 305C, and the Qth unit cell 305Q.

In various embodiments, the unit cells are not a uniform tiling of the ion trap. For example, FIG. 4 illustrates an example embodiment of an ion trap 400 in which the unit cells 405 are not a uniform tiling of the ion trap 400. In the embodiment illustrated in FIG. 4, each of the unit cells 405 is associated with a respective feed port 420. Each of the unit cells 405 are bounded such that each unit cell comprises an RF border electrode that bounds a respective trapping portion.

In various embodiments, an ion trap 300, 400 is partitioned into unit cells 305, 405 such that none of the unit cells 305, 405 defines a respective area that exceeds a set area and/or an area threshold (when the trapping portion 310 includes a two-dimensional configuration of linear trapping regions) or set length or length threshold (when the trapping portion is a one-dimensional configuration of linear trapping regions). For example, each of the unit cells 305, 405 define a respective area that is less than or equal to a set area and/or area threshold. Each of the unit cells 305, 405 is associated with a respective feed port 330, 430. For example, in various embodiments, the RF border electrode 320 of each unit cell 305, 405 is in electrical communication with (e.g., is electrically coupled to) and/or comprises a respective feed port 330, 430 configured to receive a respective RF current and/or voltage signal (e.g., via an RF trace or conductive line, a via, and/or the like) generating by a respective RF source and provide the respective RF current and/or voltage signal to the respective RF border electrode 320. In an example embodiment, each unit cell 305, 405 is associated with the same number of feed ports 330, 430. For example, in the illustrated embodiments, each unit cell 305, 405 is associated with one feed port 330, 430. In an example embodiment, each unit cell 305, 405 is associated with two feed ports 330, 430. In various embodiments, additional feed ports 330, 430 per unit cell 305, 405 may be included and the unit cell to associated feed port number may be constant across the ion trap.

In example embodiments where the trapping portion includes a one-dimensional configuration of linear trapping regions, each of the unit cells define a respective length that is less than or equal to a set length and/or length threshold. In an example embodiment where the trapping portions includes a three-dimensional configuration of linear trapping regions, the unit cells each define a respective volume that is less than or equal to a set volume and/or volume threshold.

In an example embodiment, each unit cell 305, 405 may be operated individually. For example, a user may wish to use only the first unit cell 305A, or only the first and unit cells 305A, 305B, or only the first, second, and Qth unit cells 305A, 305B, 305Q. In such instances, RF current and/or voltage signals may be applied only to the feed ports 330 associated with the unit cells that the user wishes to use. This enables the heating and magnetic field magnitude to be reduced when use of the full trap is not needed.

In various embodiments, the magnitude of the respective RF current and/or voltage signals applied to each feed port 330, 430 (associated with an in-use unit cell 305, 405) are equal and/or substantially equal to one another. In various embodiments, the magnitude of the respective RF current and/or voltage signals applied to each feed port 330, 430 (associated with an in-use unit cell 305, 405) are configured to provide a minimized current density gradient and/or magnetic field gradient across the ion trap 300, 400 (or at least across the in-use unit cells 305, 405).

In various embodiments, the RF sources, vias, and/or RF traces or conductive lines that are configured to generate and/or provide the respective RF current and/or voltage signals to the respective feed ports 330, 430 are configured to provide respective RF current and/or voltage signals that are synchronized with one another in frequency and/or phase. For example, a single RF source may be used to generate a plurality of RF current and/or voltage signals (e.g., using splitters, amplifiers, and/or the like) such that each of the RF current and/or voltage signals has a same frequency and/or phase. For example, a plurality of RF sources may be frequency locked and/or phase locked to a common reference (e.g., a reference oscillator) and/or coupled references such that each of the RF current and/or voltage signals are synchronized in (e.g., has the same) frequency and/or phase.

In various embodiments, the RF sources, vias, and/or RF traces or conductive lines that are configured to generate and/or provide the respective RF current and/or voltage signals to the respective feed ports 330, 430 are configured to provide respective RF current and/or voltage signals that cause the current density in the RF border electrodes 320 to be continuous and/or smooth (or at least have a continuous first derivative) across the ion trap 300, 400.

Example Quantum Computer Comprising an Ion Trap with Multiple Feed Ports

Ion traps are incorporated into a variety of systems used to study and/or make use of manipulatable objects. For example, ion traps may be used to perform mass spectrometry of manipulatable objects. In another example ion traps may be used to confine manipulatable objects such that quantum states of the manipulatable objects may be manipulated and/or evolved in a controlled manner. For example, the manipulatable objects may be used as qubits of a QCCD-based quantum computer.

Various embodiments provide a variety of systems comprising ion traps comprising multiple and/or a plurality of feed ports that are configured to reduce conductive loss and/or heating and/or magnetic fields caused by RF current density propagating about the ion trap (e.g., about an RF border electrode of the ion trap). One example such system is a QCCD-based quantum computer comprising an ion trap comprising multiple and/or a plurality of feed ports.

FIG. 5 provides a schematic diagram of an example quantum computer system 500 comprising an ion trap 100, 200, 300, 400, in accordance with an example embodiment. In various embodiments, the quantum computer system 500 comprises a computing entity 10 and a quantum computer

510 (e.g., a QCCD-based quantum computer). In various embodiments, the quantum computer 510 comprises a controller 30, a cryostat and/or vacuum chamber 40 enclosing an ion trap 520, and one or more manipulation sources 60. In various embodiments, the ion trap 520 comprise multiple and/or a plurality of feed ports configured to apply respective RF current and/or voltage signals to one or more RF border electrodes of the ion trap 520. For example, in various embodiments, the ion trap 520 is and/or is similar to ion trap 100, 200, 300, 400.

In an example embodiment, the one or more manipulation sources 60 may comprise one or more lasers (e.g., optical lasers, microwave sources, and/or the like). In various embodiments, the one or more manipulation sources 60 are configured to manipulate and/or cause a controlled quantum state evolution of one or more manipulatable objects trapped within and/or confined by the ion trap 520. For example, in an example embodiment, wherein the one or more manipulation sources 60 comprise one or more lasers, the lasers may provide one or more laser beams to the ion trap 520 within the cryogenic and/or vacuum chamber 40. In various embodiments, the quantum computer 510 comprises one or more voltage sources 50. For example, the voltage sources 50 may comprise one or more RF sources configured to generate and provide respective RF current and/or voltage signals to each of the multiple and/or plurality of feed ports of the ion trap 520. In various embodiments, the one or more RF sources of the voltage sources 50 are configured to provide the respective RF current and/or voltage signals such that the respective RF current and/or voltage signals are synchronized with one another in frequency and/or phase. In various embodiments, the one or more RF sources of the voltage sources 50 are configured to provide the respective RF current and/or voltage signals such that the phase of the current density propagating about the ion trap 520 is continuous and/or smooth (or at least has a continuous first derivative). For example, the phase of the current density propagating through the RF border electrode of the ion trap 520 is continuous and/or smooth (or at least has a continuous first derivative) at all points of the RF border electrode. The one or more RF sources of the voltage sources 50 may be electrically coupled to the RF border electrode(s) of the ion trap 520 via RF traces, conductive lines, vias, and/or the like.

In various embodiments, a computing entity 10 is configured to allow a user to provide input to the quantum computer 510 (e.g., via a user interface of the computing entity 10) and receive, view, and/or the like output from the quantum computer 510. The computing entity 10 may be in communication with the controller 30 of the quantum computer 510 via one or more wired or wireless networks 20 and/or via direct wired and/or wireless communications. In an example embodiment, the computing entity 10 may translate, configure, format, and/or the like information/data, quantum computing algorithms, and/or the like into a computing language, executable instructions, command sets, and/or the like that the controller 30 can understand and/or implement.

In various embodiments, the controller 30 is configured to control the voltage sources 50, cryogenic system and/or vacuum system controlling the temperature and pressure within the cryogenic and/or vacuum chamber 40, manipulation sources 60, and/or other systems controlling various environmental conditions (e.g., temperature, pressure, and/or the like) within the cryogenic and/or vacuum chamber 40 and/or configured to manipulate and/or cause a controlled evolution of quantum states of one or more manipulatable objects within the ion trap 520. In various embodiments, the manipulatable objects trapped within and/or confined by the ion trap 520 are used as qubits of the quantum computer 510.

Technical Advantages

Various embodiments provide technical solutions to technical problems relating to the generation and operation of larger ion traps. For example, in various scenarios, it is desirable to increase the number of manipulatable objects that can be trapped and/or confined by an ion trap. For example, in the example of a QCCD-based quantum computer comprising an ion trap and using trapped and/or confined manipulatable objects as qubits, increasing the number of manipulatable objects that can be confined by the ion trap results in increasing the number of qubits available for performing quantum programs and/or circuits. However, as the size of the ion trap increases, so do the conductive losses caused by the increase in the area of RF electrodes of the ion trap and the magnetic field generated by larger RF current densities required for operating the increased RF electrode area. This results in excess heating (e.g., due to the increased conductive loss) and can cause significant memory loss errors (e.g., due to the stronger magnetic field). Additionally, the current density and resulting magnetic field have significant gradients across the ion trap which makes accounting and/or correcting for the excess heating and magnetic field-caused memory errors more difficult.

Various embodiments provide technical solutions to these technical problems. In particular, various embodiments provide ion traps and/or system comprising ion traps comprising an RF border electrode that bounds a trapping portion of the ion trap. The RF border electrode comprises and/or is in electrical communication with multiple and/or a plurality of feed ports. Each feed port is configured to apply a respective RF current and/or voltage signals to the RF border electrode. In various embodiments, the respective RF current and/or voltage signals are synchronized in frequency and/or in phase. In various embodiments, the respective phases of the respective RF current and/or voltage signals are configured such that the phase of the current density is continuous and/or smooth (or at least has a continuous first derivative) across the ion trap. The multiple feed port configuration of the ion trap enables the RF electrodes (e.g., the RF border electrode, RF rails, and/or the like) to be effectively operated using a lower magnitude current density compared to conventional ion traps of similar shapes and sizes. This lower magnitude current density results in less heating through conductive losses and lower magnitude magnetic fields generated by the current density. This in turn leads to reduced memory errors in example systems such as QCCD-based quantum computers comprising ion traps having multiple and/or a plurality of feed ports compared to conventional ion traps (e.g., ion traps comprising a single feed port or single feed port per electrode). Thus, various embodiments provide improvements to the field of ion traps and systems comprising ion traps.

Exemplary Controller

In various embodiments, an ion trap 520 is incorporated into a quantum computer 510. In various embodiments, a quantum computer 510 further comprises a controller 30 configured to control various elements of the quantum computer 510. For example, the controller 30 may be configured to control the voltage sources 50, a cryogenic system and/or vacuum system controlling the temperature and pressure within the cryogenic and/or vacuum chamber 40, manipulation sources 60, and/or other systems controlling the environmental conditions (e.g., temperature, humidity, pressure, and/or the like) within the cryogenic and/or vacuum chamber 40 and/or configured to manipulate and/or cause a controlled evolution of quantum states of one or more manipulatable objects trapped within and/or confined by the ion trap 520.

As shown in FIG. 6, in various embodiments, the controller 30 may comprise various controller elements including processing elements 605, memory 610, driver controller elements 615, a communication interface 620, analog-digital converter elements 625, and/or the like. For example, the processing elements 605 may comprise programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like. and/or controllers. The term circuitry may refer to an entirely hardware embodiment or a combination of hardware and computer program products. In an example embodiment, the processing element 605 of the controller 30 comprises a clock and/or is in communication with a clock.

For example, the memory 610 may comprise non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 610 may store qubit records corresponding the qubits of quantum computer (e.g., in a qubit record data store, qubit record database, qubit record table, and/or the like), a calibration table, an executable queue, computer program code (e.g., in a one or more computer languages, specialized controller language (s), and/or the like), and/or the like. In an example embodiment, execution of at least a portion of the computer program code stored in the memory 610 (e.g., by a processing element 605) causes the controller 30 to perform one or more steps, operations, processes, procedures and/or the like for performing a quantum program or circuit, causing RF sources of the voltage sources 50 to generate and/or provide RF current and/or voltage signals to respective feed ports, and/or the like.

In various embodiments, the driver controller elements 615 may include one or more drivers and/or controller elements each configured to control one or more drivers. In various embodiments, the driver controller elements 615 may comprise drivers and/or driver controllers. For example, the driver controllers may be configured to cause one or more corresponding drivers to be operated in accordance with executable instructions, commands, and/or the like scheduled and executed by the controller 30 (e.g., by the processing element 605). In various embodiments, the driver controller elements 615 may enable the controller 30 to operate a manipulation source 60. In various embodiments, the drivers may be laser drivers; vacuum component drivers; drivers for controlling the flow of current and/or voltage applied to electrodes of the ion trap 520; cryogenic and/or vacuum system component drivers; and/or the like. In various embodiments, the controller 30 comprises means for communicating and/or receiving signals from one or more optical receiver components such as cameras, MEMs cameras, CCD cameras, photodiodes, photomultiplier tubes, and/or the like. For example, the controller 30 may comprise one or more analog-digital converter elements 625 configured to receive signals from one or more optical receiver components, calibration sensors, and/or the like.

In various embodiments, the controller 30 may comprise a communication interface 620 for interfacing and/or communicating with a computing entity 10. For example, the controller 30 may comprise a communication interface 620 for receiving executable instructions, command sets, and/or the like from the computing entity 10 and providing output received from and/or generated by the quantum computer 510 (e.g., from an optical collection system) and/or the result of a processing the output to the computing entity 10. In various embodiments, the computing entity 10 and the controller 30 may communicate via a direct wired and/or wireless connection and/or one or more wired and/or wireless networks 20.

Exemplary Computing Entity

FIG. 7 provides an illustrative schematic representative of an example computing entity 10 that can be used in conjunction with embodiments of the present invention. In various embodiments, a computing entity 10 is configured to allow a user to provide input to the quantum computer 510 (e.g., via a user interface of the computing entity 10) and receive, display, analyze, and/or the like output from the quantum computer 510.

As shown in FIG. 7, a computing entity 10 can include an antenna 712, a transmitter 704 (e.g., radio), a receiver 706 (e.g., radio), and a processing element 708 that provides signals to and receives signals from the transmitter 704 and receiver 706, respectively. The signals provided to and received from the transmitter 704 and the receiver 706, respectively, may include signaling information/data in accordance with an air interface standard of applicable wireless systems to communicate with various entities, such as a controller 30, other computing entities 10, and/or the like. In this regard, the computing entity 10 may be capable of operating with one or more air interface standards, communication protocols, modulation types, and access types. For example, the computing entity 10 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 10 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 10 can also download changes, add-ons, and updates, for instance, to its firmware, software (e.g., including executable instructions, applications, program modules), and operating system. In various embodiments, the computing entity 10 comprises a network interface 720 configured to communicate via one or more wired and/or wireless networks.

The computing entity 10 may also comprise a user interface device comprising one or more user input/output interfaces (e.g., a display 716 and/or speaker/speaker driver coupled to a processing element 708 and a touch screen, keyboard, mouse, and/or microphone coupled to a processing element 708). For instance, the user output interface may be configured to provide an application, browser, user interface, interface, dashboard, screen, webpage, page, and/or similar words used herein interchangeably executing on and/or accessible via the computing entity 10 to cause display or audible presentation of information/data and for interaction therewith via one or more user input interfaces. The user input interface can comprise any of a number of devices allowing the computing entity 10 to receive data, such as a keypad 718 (hard or soft), a touch display, voice/speech or motion interfaces, scanners, readers, or other input device. In embodiments including a keypad 718, the keypad 718 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 10 can collect information/data, user interaction/input, and/or the like.

The computing entity 10 can also include volatile storage or memory 722 and/or non-volatile storage or memory 724, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 10.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An ion trap comprising:

a trapping portion comprising one or more RF rails and one or more sequences of segmented electrodes; and a radio frequency (RF) border electrode bounding the trapping portion, wherein the RF border electrode comprises or is in electrical communication with a plurality of feed ports.

2. The ion trap of claim 1, wherein each of the plurality of feed ports is configured to apply a respective RF current and/or voltage signal of a plurality of RF current and/or voltage signals to the RF border electrode.

3. The ion trap of claim 2, wherein the plurality of RF current and/or voltage signals are synchronized in frequency.

4. The ion trap of claim 2, wherein respective positions of the plurality of feed ports and respective phases of the plurality of RF current and/or voltage signals are configured such that a phase of a current density driven in the RF border electrode by application of the plurality of RF current and/or voltage signals to the RF border electrode by the plurality of feed ports is continuous at all points of the RF border electrode.

5. The ion trap of claim 4, wherein the phase of the current density is smooth across at all the points of the RF border electrode.

6. The ion trap of claim 2, wherein the plurality of RF current and/or voltage signals are synchronized in phase.

7. The ion trap of claim 2, wherein each of the plurality of feed ports is configured to be in electrical communication with a respective RF source of one or more RF sources.

8. The ion trap of claim 7, wherein the one or more RF sources comprises a plurality of RF sources and each of the plurality of RF sources is (a) frequency-locked to at least one other of the plurality of RF sources, (b) frequency-locked to a common reference, or (c) frequency-locked to at least one of a set of coupled references.

9. The ion trap of claim 1, wherein each of the plurality of feed ports is configured to be in electrical communication with a respective RF source of one or more RF sources, each of the one or more RF sources configured to generate a respective RF current and/or voltage signal such that the respective feed port applies the respective RF current and/or voltage signal to the RF border electrode.

10. The ion trap of claim 9, wherein application of the respective RF current and/or voltage signal by the respective feed port causes an RF current density to be driven in the RF border electrode.

11. The ion trap of claim 10, wherein the RF current density is less than a single feed port current density that would be required to operate the ion trap if the ion trap only comprises a single feed port.

12. The ion trap of claim 1, wherein the plurality of feed ports are disposed at respective positions about the RF border electrode such that the respective positions are symmetric with respect to at least one axis defined by the RF border electrode.

13. The ion trap of claim 1, wherein the ion trap comprises a plurality of unit cells, each unit cell comprising a respective trapping portion, a respective RF border electrode, and a respective feed port of the plurality of feed ports.

14. The ion trap of claim 13, wherein the plurality of unit cells are a tiling of the ion trap.

15. The ion trap of claim 13, wherein each unit cell of the plurality of unit cells characterizes (a) a length that is less than or equal to a threshold length when the respective trapping portion comprises a one-dimensional configuration of linear trapping regions, (b) an area that is less than or equal to a threshold area when the respective trapping portion comprises a two-dimensional configuration of linear trapping regions, or (c) a volume that is less than or equal to a threshold volume when the respective trapping portion comprises a three-dimensional configuration of linear trapping regions.

16. The ion trap of claim 13, wherein a portion of the respective RF border electrode of a first unit cell and a portion of the respective RF border electrode of a second unit cell that is an immediate neighbor of the first unit cell is a same physical electrode.

17. The ion trap of claim 1, wherein the plurality of feed ports are configured to reduce the conductive losses of the ion trap when the ion trap is operated.

18. The ion trap of claim 1 wherein the RF border electrode is (a) a continuous RF electrode or (b) comprises two or more electrically distinct RF electrodes.

19. The ion trap of claim 1, wherein the ion trap is part of a quantum charge-coupled device (QCCD)-based quantum computer and manipulatable objects confined by the ion trap are used as qubits of the QCCD-based quantum computer.

20. The ion trap of claim 1, wherein each of the plurality of feed ports is configured to be in electrical communication with a respective RF source of one or more RF sources and a controller of the QCCD-based quantum computer is configured to control operation of the one or more RF sources.

* * * * *